United States Patent
Zhu et al.

(10) Patent No.: US 9,392,606 B2
(45) Date of Patent: Jul. 12, 2016

(54) METHOD AND APPARATUS FOR DYNAMICALLY ADJUSTING UPLINK-DOWNLINK CONFIGURATION

(75) Inventors: Dalin Zhu, Beijing (CN); Zhennian Sun, Beijing (CN); Su Yi, Beijing (CN); Gang Wang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 33 days.

(21) Appl. No.: 14/345,107

(22) PCT Filed: Mar. 30, 2012

(86) PCT No.: PCT/CN2012/073296
§ 371 (c)(1),
(2), (4) Date: Sep. 5, 2014

(87) PCT Pub. No.: WO2013/143114
PCT Pub. Date: Oct. 3, 2013

(65) Prior Publication Data
US 2014/0376369 A1    Dec. 25, 2014

(51) Int. Cl.
*H04L 1/00* (2006.01)
*H04W 72/04* (2009.01)
*H04L 5/14* (2006.01)

(52) U.S. Cl.
CPC ............ *H04W 72/0486* (2013.01); *H04L 5/14* (2013.01); *H04W 72/0446* (2013.01)

(58) Field of Classification Search
CPC ............ H04L 5/14; H04L 5/15; H04L 47/10; H04L 47/11; H04L 47/12; H04L 47/13; H04L 2012/5631; H04L 2012/5632; H04L 2012/5633; H04L 2012/5634
USPC ................. 370/229, 230, 231, 235, 280, 276
See application file for complete search history.

(56) References Cited

U.S. PATENT DOCUMENTS

| | | | |
|---|---|---|---|
| 2009/0249153 A1 | 10/2009 | Zhang | |
| 2011/0211503 A1 | 9/2011 | Che et al. | |
| 2014/0160967 A1* | 6/2014 | Gao | H04W 24/10 370/252 |
| 2014/0233439 A1* | 8/2014 | Hong | H04W 72/1221 370/280 |

FOREIGN PATENT DOCUMENTS

| | | |
|---|---|---|
| CN | 101754377 A | 6/2010 |
| CN | 1010926214 A | 12/2010 |
| CN | 102204154 A | 9/2011 |
| WO | 2011/085412 A2 | 7/2011 |

OTHER PUBLICATIONS

Communication dated Jun. 2, 2015 from the Japanese Patent Office in counterpart application No. 2014-546280.

(Continued)

*Primary Examiner* — Dady Chery
(74) *Attorney, Agent, or Firm* — Sughrue Mion, PLLC

(57) ABSTRACT

Embodiments of the disclosure provide a method and apparatus for dynamically adjusting UL-DL configuration. In the method according to embodiments of the present invention, downlink traffic load and uplink traffic load for transmission between a BS and a UE in a TDD system may be obtained, a UL-DL traffic load relation may be determined based on the downlink traffic load and the uplink traffic load and a UL-DL configuration may be selected based on the UL-DL traffic load relation.

20 Claims, 5 Drawing Sheets

(56) References Cited

OTHER PUBLICATIONS

Nokia Corporation, Nokia Siemens Networks; Evaluation results for LTE_TDD_eIMTA in isolated cell scenario [online], 3GPP TSG-RAN WG1#68, R1-120744, 8 pages total, Internet <URL:htt://www.3gpp.org/ftp/tsg_ran/WG1_RL1/TSGR1_68/Docs/R1-120744.zip>; Jan. 31, 2012.

Communication dated Jan. 19, 2016 from the Japanese Patent Office issued in corresponding Application No. 2014-546280.

ZTE, Performance evaluation of TDD allocation reconfiguration in multiple pico-cells, 3GPP TSG RAN WG1 Meeting #68bis, R1-121061, Mar. 26-30, 2012, 10 pages total.

CATT, Evaluation on TDD UL-DL reconfiguration for isolated Pico scenario, 3GPP TSG RAN WG1 Meeting #68, R1-120118, Feb. 6-10, 2012, 21 pages total.

* cited by examiner

500

Start

S501 calculate DL-UL ratios for the at least one DL-UL configuration based on factors for each of the at least one DL-UL configuration S502 rank the DL-UL ratios S503 calculate the mean value for each pair of neighboring DL-UL ratios S504 determine a range between a pair of mean values which are closet to each other S505 set a DL-UL traffic level based on the calculated range End

FIG. 5

METHOD AND APPARATUS FOR DYNAMICALLY ADJUSTING UPLINK-DOWNLINK CONFIGURATION

FIELD OF THE INVENTION

Embodiments of the present invention generally relate to communication techniques. More particularly, embodiments of the present invention relate to a method and apparatus for dynamically adjusting uplink-downlink (UL-DL) configuration.

BACKGROUND OF THE INVENTION

3GPP LTE and LTE-Advanced, also known as the evolution standard of the great success of GSM/HSPA technology, is aiming at creating a new series of specifications for the new evolving radio-access technology. One of its goals is to go on improving the communication system performance, such as the higher throughput. LTE has two different duplex modes for separating the transmission directions from the user to the base station and back: Frequency Division Duplex (FDD) and Time Division Duplex (TDD). In a TDD mode, a single bandwidth is shared between uplink (UL) and downlink (DL), with the sharing being performed by allotting different periods of time to uplink and downlink. In LTE TDD system, there are seven different patterns of uplink/downlink switching, termed uplink-downlink configurations 0 through 6. LTE TDD system allows for asymmetric UL-DL allocations by the seven different uplink-downlink configurations. LTE TDD system statically or semi-statically allocates the UL-DL configuration among cells. Generally, all the neighboring cells have the same uplink-downlink configuration, e.g., configuration 0, after configurations of the cells are deployed by the LTE TDD system. The configuration allocation is not changed during operation (static allocation) or is changed after years of operation (semi-static allocation).

In some scenarios, the static or semi-static allocation may not match the burst traffic conditions, e.g., the FTP traffic. Hence, there is a need to dynamically adjust the applied UL-DL configuration to match the traffic conditions better.

However, in practice, it is unclear how to efficiently and effectively adjust the UL-DL configuration according to the traffic conditions.

SUMMARY OF THE INVENTION

In view of the foregoing problems, there is a need to efficiently and effectively adjust the UL-DL configuration according to the traffic conditions. The present invention proposes a solution for dynamically adjusting the UL-DL configuration to better match the traffic conditions.

According to a first aspect of the present invention, embodiments of the invention provide a method for dynamically adjusting UL-DL configuration. The method may comprise steps of: obtaining downlink traffic load and uplink traffic load for transmission between a BS and a UE in a TDD system; determining a UL-DL traffic load relation based on the downlink traffic load and the uplink traffic load; and selecting a UL-DL configuration based on the UL-DL traffic load relation.

According to a second aspect of the present invention, embodiments of the invention provide an apparatus for dynamically adjusting UL-DL configuration. The apparatus may comprise: an obtaining unit for obtaining downlink traffic load and uplink traffic load for transmission between a BS and a UE in a TDD system; a determining unit for determining a UL-DL traffic load relation based on the downlink traffic load and the uplink traffic load; and a selecting unit for selecting a UL-DL configuration based on the UL-DL traffic load relation.

The following benefits are expected with the invention. With the solution according to the present invention, a most appropriate uplink-downlink subframe ratio may be adaptively and dynamically selected according to traffic load, e.g., the amount of data waiting in the uplink and downlink buffer, estimated forthcoming amount of data, and so on, so as to better balance the uplink and downlink traffic load. At the same time, the UL-DL configuration may be efficiently and effectively adjusted according to the traffic conditions.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where

FIG. 5 illustrates a flow chart of a method for determining UL-DL traffic levels according to embodiments of the invention;

DETAILED DESCRIPTION OF EMBODIMENTS

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

Figure 1:
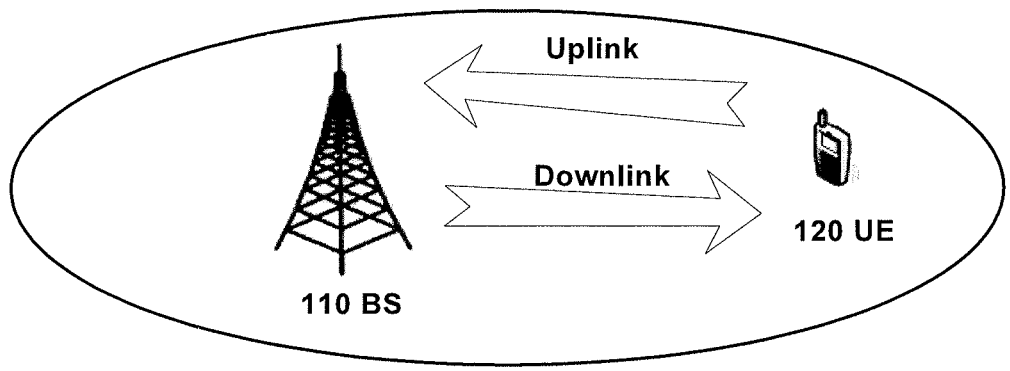
FIG. 1 illustrates a schematic diagram of a LTE TDD system.

Reference is first made to FIG. 1, which illustrates a schematic diagram of a LTE TDD system.

The communication environment of FIG. 1 illustrates a LTE TDD system. The system illustratively comprises a base station (BS) 110 and a user equipment (UE) 120. The BS 110 and the UE 120 may communicate with each other. The data transmission from the BS to the UE is called as "downlink" transmission and the data transmission from the UE to the BS is called as "uplink" transmission.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

In the disclosure, a base station (BS) may refer to a node B (NodeB or NB) or an evolved NodeB (eNodeB or eNB). A base station may be a macrocell BS or a small cell BS. According to the present invention, a macrocell BS may be a base station which manages a macrocell, for example, a macro eNB, and a small cell BS may be a base station which manages a small cell, for example, a pico eNB, a femto eNB, and some other suitable low power nodes.

For better understanding, the following embodiments of the present disclosure are described under the LTE FDD system, for example, in the communication environment of FIG. 1. As can be appreciated by those skilled in the art, the present disclosure can be applicable to any other suitable communication environment, but not limited to the specific arrangement shown in FIG. 1.

Figure 2:
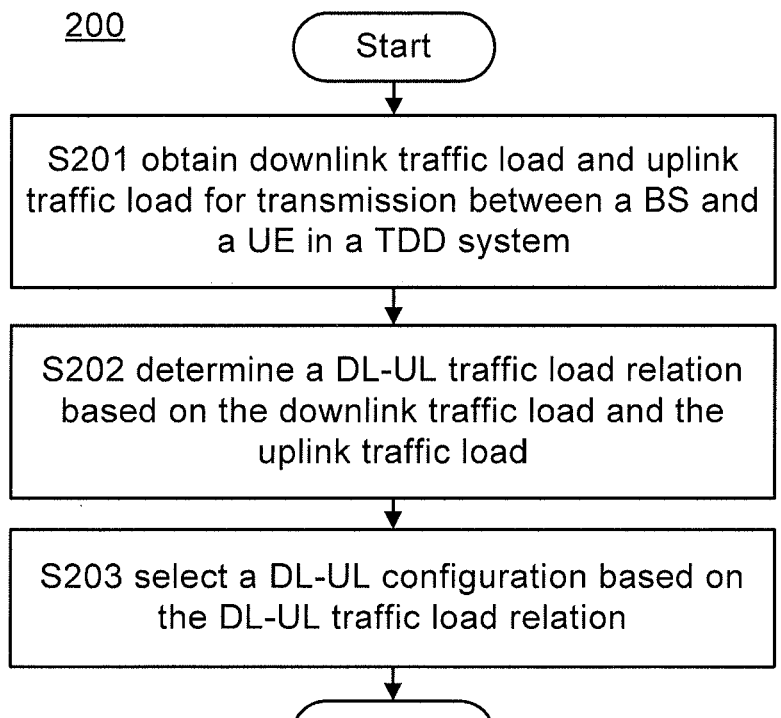
FIG. 2 illustrates a flow chart of a method for dynamically adjusting UL-DL configuration according to embodiments of the invention.

Reference is now made to FIG. 2, which illustrates a flow chart of a method 200 for dynamically adjusting UL-DL configuration according to embodiments of the invention.

At step S201, downlink traffic load and uplink traffic load for transmission between a BS and a UE in a TDD system are obtained.

According to embodiments of the present invention, the downlink traffic load and uplink traffic load may be obtained by: obtaining current downlink amount of data to be transmitted from the BS to the UE as the downlink traffic load; and/or obtaining current uplink amount of data to be transmitted from the UE to the BS as the uplink traffic load.

According to embodiments of the present invention, the downlink traffic load and uplink traffic load may be obtained by: obtaining current downlink amount of data to be transmitted from the BS to the UE, estimating a forthcoming downlink amount of data to be transmitted for a first period of time based on historical information of data which has been transmitted from the BS to the UE in a second period of time, and determining the downlink traffic load based on the current downlink amount and the forthcoming downlink amount; and/or obtaining current uplink amount of data to be transmitted from the UE to the BS, estimating a forthcoming uplink amount of data to be transmitted for a first period of time based on historical information of data which has been transmitted from the UE to the BE in a second period of time, and determining the uplink traffic load based on the current uplink amount and the forthcoming uplink amount.

At step S202, a UL-DL traffic load relation is determined based on the downlink traffic load and the uplink traffic load.

According to embodiments of the present invention, the UL-DL traffic load relation may be determined by calculating a ratio of the downlink traffic load to the uplink traffic load as the UL-DL traffic load relation.

According to embodiments of the present invention, the UL-DL traffic load relation may be determined by: calculating a ratio of the downlink traffic load to the uplink traffic load, as the UL-DL traffic load relation; weighting the ratio of the downlink traffic load to the uplink traffic load by a predetermined weight; and determining the weighted ratio as the UL-DL traffic load relation.

At step S203, a UL-DL configuration is selected based on the UL-DL traffic load relation.

According to embodiments of the present invention, a UL-DL configuration may be selected by determining UL-DL traffic levels for at least one UL-DL configuration; and selecting a UL-DL configuration from the at least one UL-DL configuration based on the UL-DL traffic load relation and the UL-DL traffic levels.

According to embodiments of the present invention, the UL-DL traffic levels for at least one UL-DL configuration may be determined by: calculating UL-DL ratios for the at least one UL-DL configuration based on factors for each of the at least one UL-DL configuration, wherein the factors comprise at least one of: the number of downlink subframes in one frame, the number of uplink subframes in one frame, the number of special subframes in one frame, the number of OFDM symbols in one subframe, the downlink ratio for the special subframe and the uplink ratio for the special subframe; and determining each UL-DL traffic level for each of the at least one UL-DL configuration based on the UL-DL ratios.

According to embodiments of the present invention, each UL-DL traffic level for each of the at least one UL-DL configuration may be determined based on the UL-DL ratios by: ranking the UL-DL ratios; calculating the mean value for each pair of neighboring UL-DL ratios; determining a range between a pair of mean values which are closest to each other; and setting a UL-DL traffic level based on the calculated range.

According to embodiments of the present invention, a UL-DL configuration may be selected from the at least one UL-DL configuration based on the UL-DL traffic load relation and the UL-DL traffic levels by: comparing the UL-DL traffic load relation with the UL-DL traffic levels; and in response to the UL-DL traffic load relation falls into one of the UL-DL traffic levels, selecting the UL-DL configuration corresponding to the one of the UL-DL traffic levels.

It is to be noted that the aforesaid embodiments are only for illustration rather than limitation. Those skilled in the art will understand that there may be some modifications and/or variations for the present invention. For example, according to further embodiments of the present invention, the method 200 may further comprise a step of updating a previous UL-DL configuration with the selected UL-DL configuration.

Figure 3:
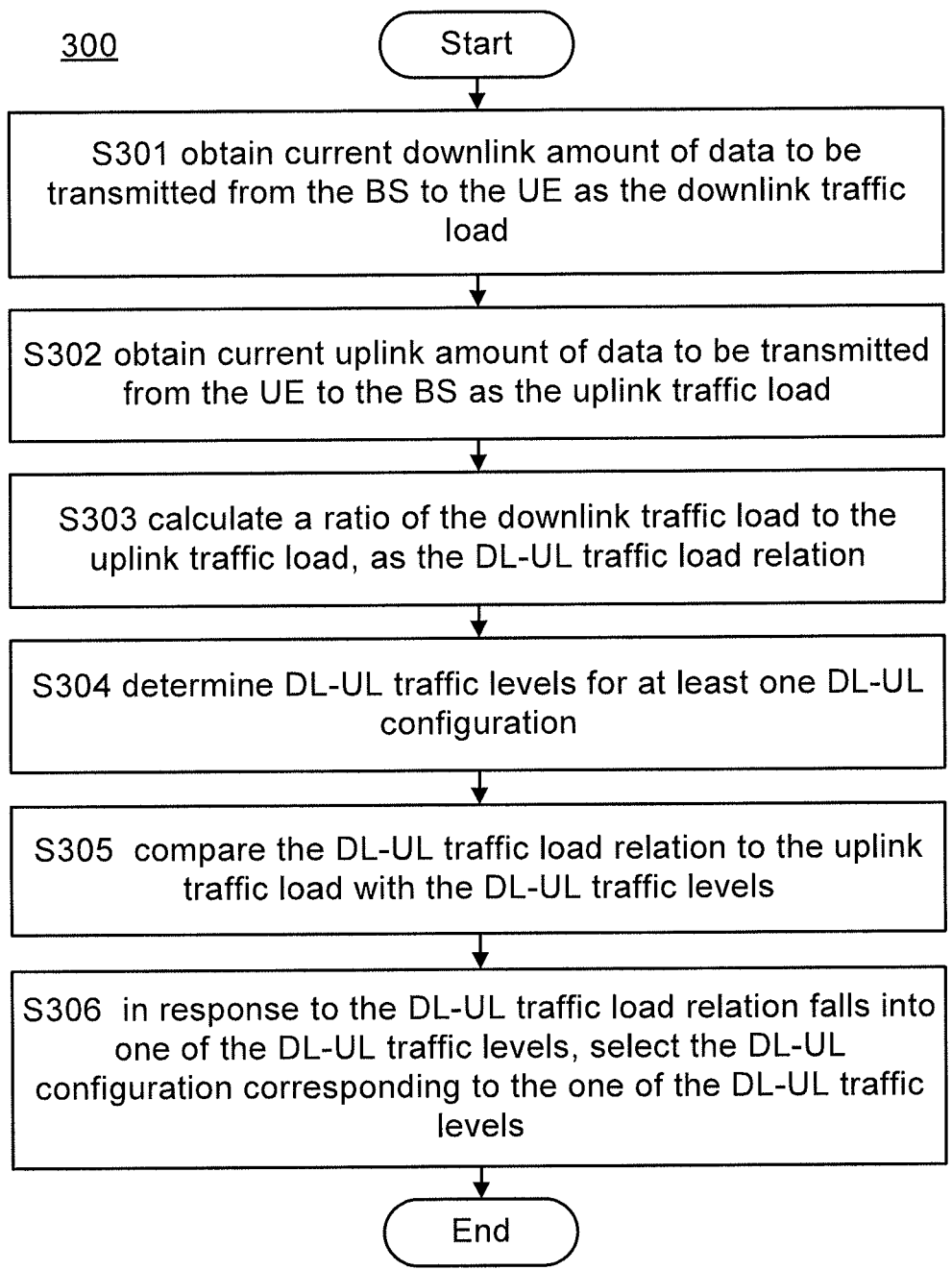
FIG. 3 illustrates a flow chart of a method for dynamically adjusting UL-DL configuration according to further embodiments of the invention.

Reference is now made to FIG. 3, which illustrates a flow chart of a method 300 for dynamically adjusting UL-DL configuration according to further embodiments of the invention.

At step S301, current downlink amount of data to be transmitted from the BS to the UE is obtained as the downlink traffic load.

According to embodiments of the present invention, the downlink traffic load may comprise current downlink amount of data to be transmitted from the BS to the UE. As such, the current downlink amount of data to be transmitted from the BS to the UE may be obtained as the downlink traffic load. According to other embodiments of the present invention, the information on the current downlink amount of data to be transmitted from the BS to the UE may be stored in a DL buffer before the current downlink transmission is performed.

Accordingly, the information on the current downlink amount of data to be transmitted from the BS to the UE may be retrieved from the DL buffer and considered as the downlink traffic load.

At step S302, current uplink amount of data to be transmitted from the UE to the BS is obtained as the uplink traffic load.

According to embodiments of the present invention, the uplink traffic load may comprise current uplink amount of data to be transmitted from the UE to the BS. As such, the current uplink amount of data to be transmitted from the UE to the BS may be obtained as the uplink traffic load.

As can be appreciated by a skilled in the art, the DL buffer and/or the UL buffer may be implemented with a memory or storage at the BS or some other accessible device. The memory or storage may be a portable computer magnetic disk, hard disk, random access memory (RAM), read-only memory (ROM), erasable programmable read-only memory (EPROM or flash), optical fiber, portable compact disk read-only memory (CD-ROM), optical storage device, or a magnetic storage device.

It is to be noted that there is no strict precedence between steps S301 and S302. Therefore, the step S302 may be performed either before or after step S301, which will not have any effect on the performance of the invention.

At step S303, a ratio of the downlink traffic load to the uplink traffic load is calculated as the UL-DL traffic load relation.

According to embodiments of the present invention, the UL-DL traffic load relation represents the relation between the downlink traffic load and uplink traffic load. The UL-DL traffic load relation may be implemented in several forms, for example, a ratio of the downlink traffic load to the uplink traffic load. Assuming that the downlink traffic load is denoted as $N_T^{DL}$ and the uplink traffic load is denoted as $N_T^{UL}$, the ratio of the downlink traffic load to the uplink traffic load may be denoted as $R_T$ and calculated as:

$$R_T = \frac{N_T^{DL}}{N_T^{UL}}. \tag{1}$$

It is to be noted that the ratio of the downlink traffic load to the uplink traffic load may be calculated in several concrete formulas. In another embodiment, the ratio of the downlink traffic load to the uplink traffic load may be calculated as:

$$R_T = \frac{N_T^{UL}}{N_T^{DL}}. \tag{2}$$

As can be appreciated by those skilled in the art, with respect to different ratios of the downlink traffic load to the uplink traffic load, such as ratios calculated by equation (1) and (2), the UL-DL traffic levels for one UL-DL configuration may be determined in different ways. As such, different sets of the UL-DL traffic levels may be directed to different ratios.

According to some other embodiments of the present invention, in addition to the above ratio, the UL-DL traffic load relation may be further implemented as a weighted ratio, which may be obtained by weighting the ratio of the downlink traffic load to the uplink traffic load by a predetermined weight. In embodiments of the present invention, the predetermined weight may be determined in several ways. According to an embodiment, the predetermined weight may be preset as a constant value, which may be determined based on experience of those skilled in the art or any other proper way. According to another embodiment, the predetermined weight may be determined dynamically based on statistical information of the historical traffic conditions. For example, a downlink mean value of the distribution of the downlink traffic load and an uplink mean value of the distribution of the uplink traffic load for a period of time may be calculated first, the weight then may be set as the ratio of the downlink mean value and the uplink mean value.

As can be appreciated by those skilled in the art, the UL-DL traffic load relation may be implemented in some other suitable forms, and the above ratio and weighted ratio are only for illustration rather than limitation.

At step S304, UL-DL traffic levels for at least one UL-DL configuration are determined.

For a LTE TDD system, there are seven different patterns of uplink/downlink switching, termed uplink-downlink configurations 0 through 6. LTE TDD system allows for asymmetric UL-DL allocations by the seven different uplink-downlink configurations. Table 1 shows the seven UL-DL configurations defined for a LTE TDD system.

TABLE 1

UL-DL Configurations

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, a subframe denoted as "D" means that the subframe is for downlink, a subframe denoted as "U" means that the subframe is for uplink, and a subframe denoted as "S" means that the subframe is a special subframe, which comprises guard period (GP), Uplink Pilot Time Slot (UpPTS), Downlink Pilot Time Slot (DwPTS), etc. From the Table 1, it is seen that LTE TDD system allows for asymmetric UL-DL allocations by the seven uplink-downlink configurations.

With respect to each UL-DL configuration, UL-DL traffic levels may be different, since different UL-DL configurations has different way for allocating UL subframes and DL subframes. According to embodiments of the present invention, the UL-DL traffic levels for each UL-DL configuration may be preset or calculated before the process of dynamically adjusting the UL-DL configuration. Alternatively, the UL-DL traffic levels for each UL-DL configuration may be calculated in real time, e.g., during the process of dynamically adjusting the UL-DL configuration. According to embodiments of the present invention, the UL-DL traffic levels may be calculated either in advance or in real time with the method as illustrated in FIG. 5.

Reference is now made to FIG. 5, which illustrates a flow chart of a method 500 for determining UL-DL traffic levels according to embodiments of the invention.

At step S501, UL-DL ratios for the at least one UL-DL configuration are calculated based on factors for each of the at least one UL-DL configuration.

According to embodiments of the present invention, the factors for a UL-DL configuration may comprise at least one of: the number of downlink subframes in one frame, the number of uplink subframes in one frame, the number of special subframes in one frame, the number of OFDM symbols in one subframe, the downlink ratio for the special subframe and the uplink ratio for the special subframe. Based on the factors for a UL-DL configuration, the corresponding UL-DL ratio for this UL-DL configuration may be calculated in several ways, e.g., calculated as below:

$$R_{config} = \frac{N_{DL} \times N_{OFDM} + N_S \times N_{OFDM} \times S_{DwPTS}}{N_{UL} \times N_{OFDM} + N_S \times N_{OFDM} \times S_{UpPTS}}. \quad (3)$$

In equation (3), $R_{config}$ indicates the UL-DL ratio for this subject UL-DL configuration, e.g., when the subject UL-DL configuration is configuration 6, the $R_{config}$ calculated according to equation (3) is the UL-DL ratio for configuration 6. Further, $N_{DL}$ represents the number of downlink subframes in one frame, $N_{UL}$ represents the number of uplink subframes in one frame, $N_S$ represents the number of special subframes in one frame, $N_{OFDM}$ represents the number of OFDM symbols in one subframe. Additionally, $S_{DwPTS}$ represents the downlink ratio for the special subframe, and $S_{UpPTS}$ represents the uplink ratio for the special subframe, wherein the downlink ratio for the special subframe may be the ratio of DwPTS in a special subframe, and the uplink ratio for the special subframe may be the ratio of UpPTS in a special subframe. By means of equation (3), the UL-DL ratios for all of the UL-DL configurations may be obtained when factors for each UL-DL configuration are taken into account.

It is to be noted that, there may be other suitable ways to calculate the UL-DL ratio for a configuration, the embodiment which employs equation (3) in calculating the UL-DL ratio is only for illustration rather than limitation.

According to an embodiment of the present invention, assuming that special subframe configuration #8 is employed, the UL-DL ratios for the seven UL-DL configurations, that is, configuration 0, configuration 1, . . . , configuration 6, may be calculated as 0.6280, 104492, . . . , 0.9566. The concrete values are shown in Table 2.

TABLE 2

Example of UL-DL ratios for seven configurations

| configuration | | | | | | |
|---|---|---|---|---|---|---|
| 0 | 1 | 2 | 3 | 4 | 5 | 6 |
| UL-DL ratio 0.6280 | 1.4492 | 3.913 | 2.302 | 3.957 | 8.921 | 0.9566 |

At step S502, the UL-DL ratios are ranked.

After the UL-DL ratios corresponding to respective UL-DL configurations at step S501, these UL-DL ratios may be ranked in an ascending order or in a descending order. Table 3 shown a ranking result of the UL-DL ratios for these seven configurations obtained at step S501.

TABLE 3

Ranking result of the UL-DL ratios

| configuration | | | | | | |
|---|---|---|---|---|---|---|
| 0 | 6 | 1 | 3 | 2 | 4 | 5 |
| UL-DL ratio 0.6280 | 0.9566 | 1.4492 | 2.302 | 3.9130 | 3.975 | 8.921 |

From Table 3, it is seen that the UL-DL ratios are ranked in an ascending order, the seven UL-DL configurations are accordingly ranked as configurations 0, 6, 1, 3, 2, 4 and 5.

At step S503, the mean value for each pair of neighboring UL-DL ratios is calculated.

According to the ranking result of the UL-DL ratios, every two neighboring UL-DL ratios may be considered as a pair of neighboring UL-DL ratios. For example, UL-DL ratios for configuration 0 and configuration 6 are a pair of neighboring UL-DL ratios, and UL-DL ratios for configuration 6 and configuration 1 are also a pair of neighboring UL-DL ratios, so do the UL-DL ratios for configurations 1 and 3, configurations 3 and 2, configurations 2 and 4, and configurations 4 and 5. For each pair of neighboring UL-DL ratios, the mean value may be determined according to existing means. For example, the mean value for the pair of UL-DL ratios for configuration 0 and configuration 6 may be calculated by averaging the sum of the two UL-DL ratios, 0.6280 and 0.9566, which equals to 0.7923. Likewise, the mean value for the pair of UL-DL ratios for configuration 6 and configuration 1 is 1.2029, the mean value for the pair of UL-DL ratios for configuration 1 and configuration 3 is 1.8756, the mean value for the pair of UL-DL ratios for configuration 3 and configuration 2 is 3.1075, the mean value for the pair of UL-DL ratios for configuration 2 and configuration 4 is 3.935, and the mean value for the pair of UL-DL ratios for configuration 4 and configuration 5 is 6.439. Table 4 shows the mean values for the UL-DL ratios.

TABLE 4

Mean values for the UL-DL ratios

| | configuration | | | | | | |
|---|---|---|---|---|---|---|---|
| | 0 | 6 | 1 | 3 | 2 | 4 | 5 |
| UL-DL ratio | 0.6280 | 0.9566 | 1.4492 | 2.302 | 3.9130 | 3.975 | 8.921 |
| Mean Value | | 0.7923 | 1.2029 | 1.8756 | 3.1075 | 3.935 | 6.439 |

It is to be noted that the mean value is just described for purpose of example. According to other embodiments of the present invention, the mean value may be alternatively replaced with a target value obtained based on the range of a pair of neighboring UL-DL ratios. For example, for the pair of neighboring UL-DL ratios for configuration 0 and configuration 6, i.e., 0.6280 and 0.9566, it may be determined that the range between the two ratios is from 0.6280 to 0.9566. In this example, any value falls into the range from 0.6280 to 0.9566 may be taken as the target value.

At step S504, a range between a pair of mean values which are closest to each other is determined.

For example, the range (0.7923, 1.2029] may be determined as the range between a pair of closest mean values 0.7923 and 1.2029. Likewise, ranges (1.2029, 1.8756], (3.1075, 3.935], (1.8756, 3.1075] and (3.935, 6.439] may be determined based on each pair of mean values (1.2029, 1.8756, 3.1075, 3.935, and 6.439) which are closest to each other. With respect to the minimum mean value 0.7923 illustrated in Table 4, the range (0, 0.7923] may be determined. With respect to the maximum mean value 6.439 illustrated in Table 4, the range (6.439, +∞) may be determined.

At step S505, a UL-DL traffic level is set based on the calculated range.

Table 5 shows the ranges determined based on mean values obtained at step S503. As shown in Table 5, for example, the range (0.7923, 1.2029] may be set as the UL-DL traffic level for configuration 6. Likewise, the respective UL-DL traffic levels for configurations 1, 2, 3 and 4 may be set based on ranges (1.2029, 1.8756], (3.1075, 3.935], (1.8756, 3.1075] and (3.935, 6.439]. With respect to configuration 0 and configuration 5, which are the first one and the last one respectively, the respective UL-DL traffic levels are set as (0,0.7923] and (6.439, +∞).

TABLE 5

UL-DL traffic levels for seven configurations

| configuration | UL-DL traffic levels |
| --- | --- |
| 0 | (0, 0.7923] |
| 6 | (0.7923, 1.2029] |
| 1 | (1.2029, 1.8756] |
| 3 | (1.8756, 3.1075] |
| 2 | (3.1075, 3.935] |
| 4 | (3.935, 6.439] |
| 5 | (6.439, +∞) |

At step S305, the UL-DL traffic load relation to the uplink traffic load are compared with the UL-DL traffic levels.

According to embodiments of the present invention, the ratio of the downlink traffic load to the uplink traffic load has been calculated as the UL-DL traffic load relation at step S303. For example, assuming the calculated ratio of the downlink traffic load to the uplink traffic load is 0.8596, this ratio will be compared with the UL-DL traffic levels for respective configurations at step S305. Specifically, the value 0.8596 may be compared with the UL-DL traffic levels (0, 0.7923], (0.7923, 1.2029], (1.2029, 1.8756], (1.8756, 3.1075], (3.1075, 3.935], (3.935, 6.439] and (6.439, +∞), as shown in Table 5.

At step S306, in response to the UL-DL traffic load relation falls into one of the UL-DL traffic levels, the UL-DL configuration corresponding to the one of the UL-DL traffic levels is selected.

With respect to the above example, by comparing the ratio 0.8596 may be compared with the UL-DL traffic levels (0, 0.7923], (0.7923, 1.2029], (1.2029, 1.8756], (1.8756, 3.1075], (3.1075, 3.935], (3.935, 6.439] and (6.439, +∞), it may be determined that the ratio 0.8596 falls into the UL-DL traffic level (0.7923, 1.2029]. Accordingly, at step S306, the UL-DL configuration 6 which corresponds to the UL-DL traffic level (0.7923, 1.2029] may be selected and may be employed as the target configuration suitable for current traffic conditions.

According to further embodiments of the present invention, after selecting the UL-DL configuration, e.g., configuration 6, the previous UL-DL configuration may be updated with the newly selected configuration, so as to better adapt to the current traffic conditions.

Figure 4:
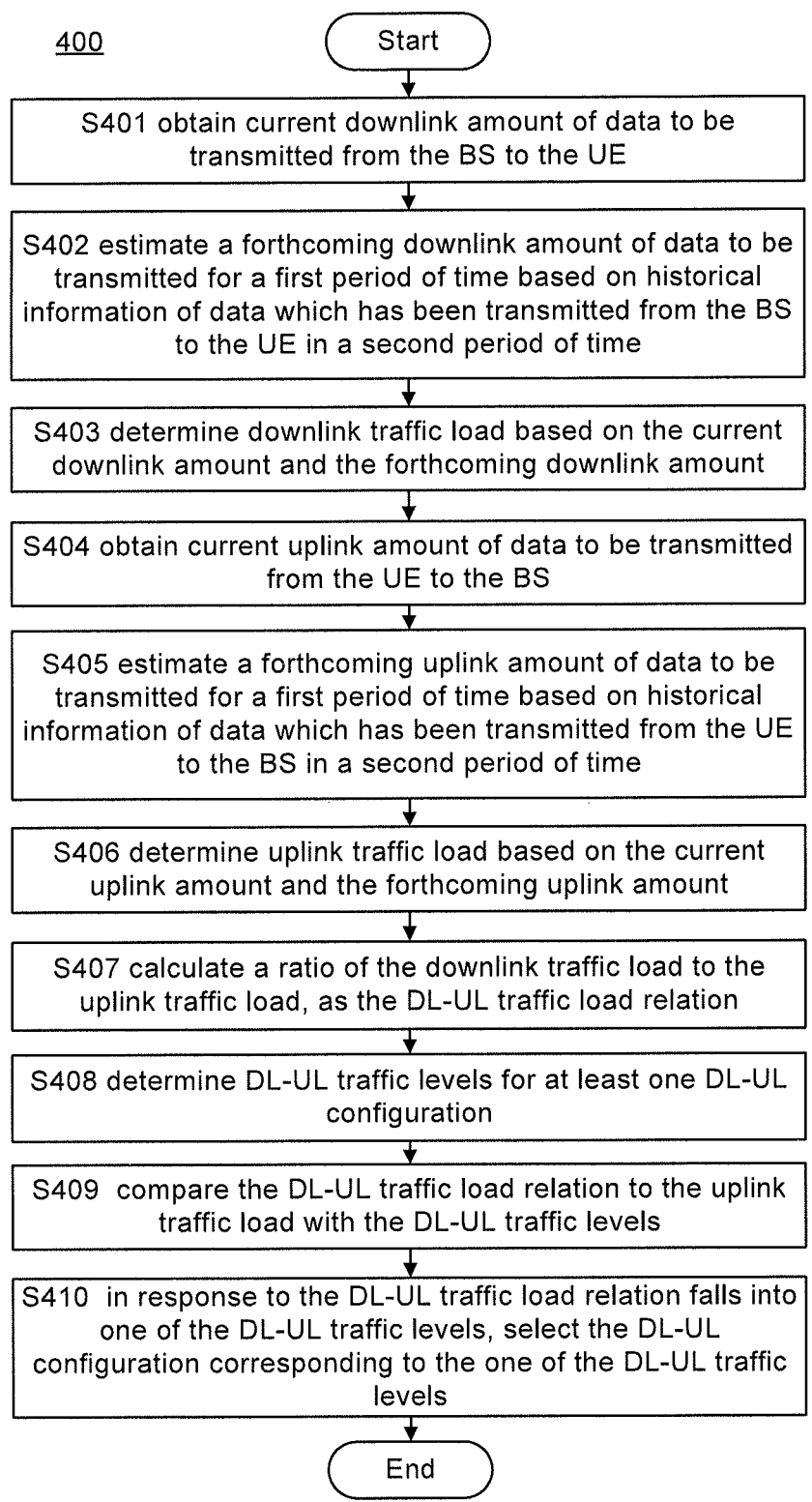
FIG. 4 illustrates a flow chart of a method for dynamically adjusting UL-DL configuration according to further embodiments of the invention.

Reference is now made to FIG. 4, which illustrates a flow chart of a method 400 for dynamically adjusting UL-DL configuration according to further embodiments of the invention. The embodiments illustrated by FIG. 4 mainly differ from those illustrated by FIG. 4 in the process of obtaining downlink traffic load and uplink traffic load for transmission between a BS and a UE. Specifically, in embodiments illustrated by FIG. 4, the downlink/uplink traffic load is determined based on the current downlink/uplink amount and the forthcoming downlink/uplink amount, while in embodiments illustrated by FIG. 3, the downlink/uplink traffic load is determined based on the current downlink/uplink amount.

At step S401, current downlink amount of data to be transmitted from the BS to the UE is obtained. This step is similar to step S301, so all details as describe at step S301 are applicable to step S401.

At step S402, a forthcoming downlink amount of data to be transmitted for a first period of time is estimated based on historical information of data which has been transmitted from the BS to the UE in a second period of time.

According to embodiments of the present invention, the forthcoming downlink amount of data to be transmitted for a first period of time may be a prediction for downlink data to be transmitted in a next period of time. The first period of time may be predetermined or set according to experience of a skilled person.

According to further embodiments of the present invention, the historical information of data which has been transmitted from the BS to the UE in a second period of time may be information on downlink transmission during a passed period of time. The second period of time may be predetermined or set according to experience of a skilled person.

Figure 7:
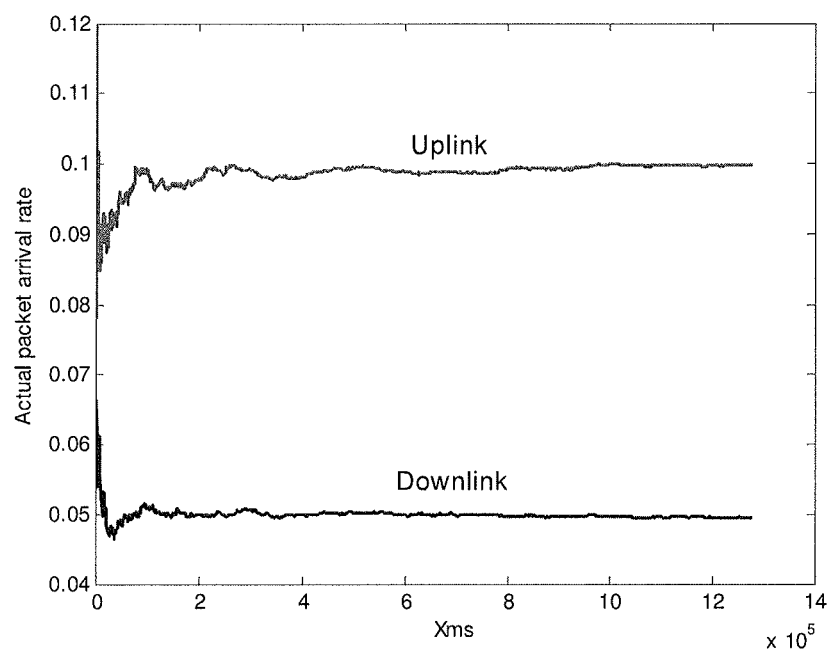
FIG. 7 illustrates a diagram of downlink and uplink data which has been transmitted from the BS to the UE according to embodiments of the invention.

The historical information of data which has been transmitted from the BS to the UE may comprise statistical information on downlink transmission during the second period of time. According to embodiments of the present invention, assuming that the historical information of data which has been transmitted from the BS to the UE in a second period of time may be modeled as independent Poisson distribution with arrival rate. FIG. 7 illustrates a diagram of downlink and uplink data which has been transmitted from the BS to the UE according to embodiments of the invention. In these embodiments, the second period of time may be more or less than the first period of time.

As is shown in FIG. 7, the DL and UL arrival rates quickly converge with increase in time. Therefore, historical information of data which has been transmitted from the BS to the UE in a second period of time, e.g., the arrived DL packets in recent T ms, may be employed to estimate forthcoming downlink amount of data to be transmitted for a first period of time, e.g., the forthcoming DL packets. According to embodiments of the present invention, the forthcoming downlink amount of data to be transmitted for a first period of time (denoted as $N_{p,f}$) may be calculated as below.

$$N_{p,f} = \frac{N_p(T+X)}{T} - N_p \quad (4)$$

Here, $N_p$ denotes the arrived packet size in T ms; T represents the second period of time; and X denotes that the BS reconfigures the DL-UL allocations every X ms.

According to embodiments of the present invention, if the historical information on downlink traffic or uplink traffic is modeled as non-homogeneous Poisson process (i.e., correlated in time), similar prediction approach (e.g., Bayesian estimation) may be developed to estimate the forthcoming downlink/uplink amount of data to be transmitted for a first period of time.

Additionally, for other traffic models (with or without memories), similar estimation/prediction methods may be applied to calculate the arriving DL and UL packets by accounting for the traffic statistics information.

At step S403, downlink traffic load is determined based on the current downlink amount and the forthcoming downlink amount.

According to embodiments of the present invention, the downlink traffic load may comprise two portions, one is the current downlink amount, and the other is forthcoming downlink amount.

In some embodiments, the downlink traffic load may be determined by summarizing the current downlink amount and the forthcoming downlink amount. In some other embodiments, the downlink traffic load may be determined by weighting the current downlink amount and the forthcoming downlink amount with predetermined weights respectively and summarizing the weighted current downlink amount and weighted forthcoming downlink amount. It is to be noted that, there may be several other ways to determine the downlink traffic load based on the current downlink amount and the forthcoming downlink amount, and the above examples are only for illustration, not limitation.

At step S404, current uplink amount of data to be transmitted from the UE to the BS is obtained. This step is similar to step S302, so all details as describe at step S302 are applicable to step S404.

At step S405, a forthcoming uplink amount of data to be transmitted for a first period of time is estimated based on historical information of data which has been transmitted from the UE to the BS in a second period of time.

According to embodiments of the present invention, the forthcoming uplink amount of data to be transmitted for a first period of time may be a prediction for uplink data to be transmitted in a next period of time. The first period of time may be predetermined or set according to experience of a skilled person.

According to further embodiments of the present invention, the historical information of data which has been transmitted from the UE to the BS in a second period of time may be information on uplink transmission during a passed period of time. The second period of time may also be predetermined or set according to experience of a skilled person.

According to embodiments of the present invention, the forthcoming uplink amount of data to be transmitted for a first period of time may be calculated with equation (4).

At step S406, uplink traffic load is determined based on the current uplink amount and the forthcoming uplink amount.

According to embodiments of the present invention, the uplink traffic load may comprise two portions, one is the current uplink amount, and the other is forthcoming uplink amount. In some embodiments, the uplink traffic load may be determined by summarizing the current uplink amount and the forthcoming uplink amount. In some other embodiments, the uplink traffic load may be determined by weighting the current uplink amount and the forthcoming uplink amount with predetermined weights respectively and summarizing the weighted current uplink amount and weighted forthcoming uplink amount.

At step S407, a ratio of the downlink traffic load to the uplink traffic load is calculated as the UL-DL traffic load relation. This step is similar to step S303, so all details as describe at step S303 are applicable to step S407.

At step S408, UL-DL traffic levels for at least one UL-DL configuration are determined. This step is similar to step S304, so all details as describe at step S304 are applicable to step S408.

At step S409, the UL-DL traffic load relation to the uplink traffic load are compared with the UL-DL traffic levels. This step is similar to step S305, so all details as describe at step S304 are applicable to step S409.

At step S410, in response to the UL-DL traffic load relation falls into one of the UL-DL traffic levels, the UL-DL configuration corresponding to the one of the UL-DL traffic levels is selected. This step is similar to step S306, so all details as describe at step S304 are applicable to step S410.

Figure 6:
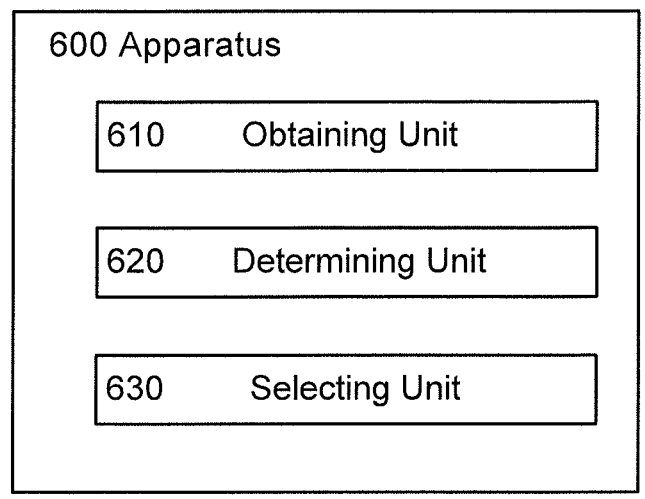
FIG. 6 illustrates a block diagram of an apparatus for dynamically adjusting UL-DL configuration according to embodiments of the invention.

Reference is now made to FIG. 6, which illustrates a block diagram of an apparatus 600 for dynamically adjusting UL-DL configuration according to embodiments of the invention. The apparatus 600 may be implemented at the BS or some other suitable devices.

According to embodiments of the present invention, the apparatus 600 may comprises: a obtaining unit 610 for obtaining downlink traffic load and uplink traffic load for transmission between a base station (BS) and a user equipment (UE) in a Time Division Duplex (TDD) system; a determining unit 620 for determining a UL-DL traffic load relation based on the downlink traffic load and the uplink traffic load; and a selecting unit 630 for selecting a UL-DL configuration based on the UL-DL traffic load relation.

According to embodiments of the present invention, the obtaining unit 610 may comprise: means for obtaining current downlink amount of data to be transmitted from the BS to the UE as the downlink traffic load; and/or means for obtaining current uplink amount of data to be transmitted from the UE to the BS as the uplink traffic load.

According to embodiments of the present invention, the obtaining unit 610 may comprise: means for obtaining current downlink amount of data to be transmitted from the BS to the UE, means for estimating a forthcoming downlink amount of data to be transmitted for a first period of time based on historical information of data which has been transmitted from the BS to the UE in a second period of time, and means for determining the downlink traffic load based on the current downlink amount and the forthcoming downlink amount; and/or means for obtaining current uplink amount of data to be transmitted from the UE to the BS, means for estimating a forthcoming uplink amount of data to be transmitted for a first period of time based on historical information of data which has been transmitted from the UE to the BE in a second period of time, and means for determining the uplink traffic load based on the current uplink amount and the forthcoming uplink amount.

According to embodiments of the present invention, the determining unit 620 may comprise: means for calculating a ratio of the downlink traffic load to the uplink traffic load, as the UL-DL traffic load relation.

According to embodiments of the present invention, the determining unit 620 may comprise: means for calculating a ratio of the downlink traffic load to the uplink traffic load, as the UL-DL traffic load relation; means for weighting the ratio of the downlink traffic load to the uplink traffic load by a predetermined weight; and means for determining the weighted ratio as the UL-DL traffic load relation.

According to embodiments of the present invention, the selecting unit 630 may comprise: determining means for determining UL-DL traffic levels for at least one UL-DL configuration; and selecting means for selecting a UL-DL configuration from the at least one UL-DL configuration based on the UL-DL traffic load relation and the UL-DL traffic levels. According to embodiments of the present invention, the determining means may comprise: means for calculating UL-DL ratios for the at least one UL-DL configuration based on factors for each of the at least one UL-DL configuration, wherein the factors comprise at least one of: the number of downlink subframes in one frame, the number of uplink subframes in one frame, the number of special subframes in one frame, the number of OFDM symbols in one subframe, the downlink ratio for the special subframe and the uplink ratio for the special subframe; and means for determining each UL-DL traffic level for each of the at least one UL-DL configuration based on the UL-DL ratios. According to embodiments of the present invention, the means for determining each UL-DL traffic level for each of the at least one UL-DL configuration based on the UL-DL ratios may comprise: means for ranking the UL-DL ratios; means for calculating the mean value for each pair of neighboring UL-DL ratios; means for determining a range between a pair of mean values which are closest to each other; and means for setting a UL-DL traffic level based on the calculated range.

According to embodiments of the present invention, the selecting means 630 may comprise: means for comparing the UL-DL traffic load relation with the UL-DL traffic levels; and means for selecting, in response to the UL-DL traffic load relation falls into one of the UL-DL traffic levels, the UL-DL configuration corresponding to the one of the UL-DL traffic levels.

According to embodiments of the present invention, the apparatus 600 may further comprise: an updating unit (not shown) for updating a previous UL-DL configuration with the selected UL-DL configuration.

It is noted that the apparatus 600 may be configured to implement functionalities as described with reference to FIGS. 2-4. Therefore, the features discussed with respect to any of methods 200, 300 and 400 may apply to the corresponding components of the apparatus 600. It is further noted that the components of the apparatus 600 may be embodied in hardware, software, firmware, and/or any combination thereof. For example, the components of the apparatus 600 may be respectively implemented by a circuit, a processor or any other appropriate selection device. Those skilled in the art will appreciate that the aforesaid examples are only for illustration not limitation.

In some embodiment of the present disclosure, the apparatus 600 comprises at least one processor. The at least one processor suitable for use with embodiments of the present disclosure may include, by way of example, both general and special purpose processors already known or developed in the future. The apparatus 600 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 600 to at least perform according to any of methods 200, 300 and 400 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2-5 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for dynamically adjusting uplink-downlink (UL-DL) configuration, comprising:

obtaining downlink traffic load and uplink traffic load for transmission between a base station (BS) and a user equipment (UE) in a Time Division Duplex (TDD) system;

determining a UL-DL traffic load relation based on the downlink traffic load and the uplink traffic load; and selecting a UL-DL configuration based on the UL-DL traffic load relation,
wherein the downlink traffic load is determined based on a current downlink amount and an estimated forthcoming downlink amount or the uplink traffic load is determined based on a current uplink amount and an estimated forthcoming uplink amount.

2. The method of claim 1, wherein obtaining downlink traffic load and uplink traffic load for transmission between a BS and a UE in a TDD system comprises:
obtaining current downlink amount of data to be transmitted from the BS to the UE as the downlink traffic load; or
obtaining current uplink amount of data to be transmitted from the UE to the BS as the uplink traffic load.

3. The method of claim 1, wherein obtaining downlink traffic load and uplink traffic load for transmission between a BS and a UE in a TDD system comprises:
obtaining current downlink amount of data to be transmitted from the BS to the UE,
estimating the forthcoming downlink amount of data to be transmitted for a first period of time based on historical information of data which has been transmitted from the BS to the UE in a second period of time, and
determining the downlink traffic load based on the current downlink amount and the forthcoming downlink amount; or
obtaining current uplink amount of data to be transmitted from the UE to the BS,
estimating the forthcoming uplink amount of data to be transmitted for a first period of time based on historical information of data which has been transmitted from the UE to the BE in a second period of time, and
determining the uplink traffic load based on the current uplink amount and the forthcoming uplink amount.

4. The method of claim 1, wherein determining a UL-DL traffic load relation based on the downlink traffic load and the uplink traffic load comprises:
calculating a ratio of the downlink traffic load to the uplink traffic load, as the UL-DL traffic load relation.

5. The method of claim 1, wherein determining a UL-DL traffic load relation based on the downlink traffic load and the uplink traffic load comprises:
calculating a ratio of the downlink traffic load to the uplink traffic load, as the UL-DL traffic load relation;
weighting the ratio of the downlink traffic load to the uplink traffic load by a predetermined weight; and
determining the weighted ratio as the UL-DL traffic load relation.

6. The method of claim 1, wherein selecting a UL-DL configuration based on the UL-DL traffic load relation comprises:
determining UL-DL traffic levels for at least one UL-DL configuration; and
selecting a UL-DL configuration from the at least one UL-DL configuration based on the UL-DL traffic load relation and the UL-DL traffic levels.

7. The method of claim 6, wherein determining UL-DL traffic levels for at least one UL-DL configuration comprises:
calculating UL-DL ratios for the at least one UL-DL configuration based on factors for each of the at least one UL-DL configuration, wherein the factors comprise at least one of: the number of downlink subframes in one frame, the number of uplink subframes in one frame, the number of special subframes in one frame, the number of OFDM symbols in one subframe, the downlink ratio for the special subframe and the uplink ratio for the special subframe; and
determining each UL-DL traffic level for each of the at least one UL-DL configuration based on the UL-DL ratios.

8. The method of claim 7, wherein determining each UL-DL traffic level for each of the at least one UL-DL configuration based on the UL-DL ratios comprises:
ranking the UL-DL ratios;
calculating the mean value for each pair of neighboring UL-DL ratios;
determining a range between a pair of mean values which are closest to each other; and
setting a UL-DL traffic level based on the calculated range.

9. The method of claim 6, wherein selecting a UL-DL configuration from the at least one UL-DL configuration based on the UL-DL traffic load relation and the UL-DL traffic levels comprises:
comparing the UL-DL traffic load relation with the UL-DL traffic levels; and
in response to the UL-DL traffic load relation falls into one of the UL-DL traffic levels, selecting the UL-DL configuration corresponding to the one of the UL-DL traffic levels.

10. The method of claim 1, further comprising:
updating a previous UL-DL configuration with the selected UL-DL configuration.

11. An apparatus for dynamically adjusting uplink-downlink (UL-DL) configuration, comprising:
at least one memory operable to store program code;
at least one processor operable to access said memory and read said program code and operate as instructed by said program code, said program code including:
obtaining code configured to cause the at least one processor to obtain downlink traffic load and uplink traffic load for transmission between a base station (BS) and a user equipment (UE) in a Time Division Duplex (TDD) system;
determining code configured to cause the at least one processor to determine a UL-DL traffic load relation based on the downlink traffic load and the uplink traffic load; and
selecting code configured to cause the at least one processor to select a UL-DL configuration based on the UL-DL traffic load relation,
wherein the downlink traffic load is determined based on a current downlink amount and an estimated forthcoming downlink amount or the uplink traffic load is determined based on a current uplink amount and an estimated forthcoming uplink amount.

12. The apparatus of claim 11, wherein the obtaining code is further configured to cause the al least one processor to:
obtain current downlink amount of data to be transmitted from the BS to the UE as the downlink traffic load; or
obtain current uplink amount of data to be transmitted from the UE to the BS as the uplink traffic load.

13. The apparatus of claim 11, wherein the obtaining code is further configured to cause the at least one processor to:
obtain current downlink amount of data to be transmitted from the BS to the UE, estimate forthcoming downlink amount of data to be transmitted for a first period of time based on historical information of data which has been transmitted from the BS to the UE in a second period of time, and the downlink traffic load based on the current downlink amount and the forthcoming downlink amount; or
obtain current uplink amount of data to be transmitted from the UE to the BS, estimate the forthcoming uplink amount of data to be transmitted for a first period of time based on historical information of data which has been transmitted from the UE to the BE in a second period of time, and determine the uplink traffic load based on the current uplink amount and the forthcoming uplink amount.

14. The apparatus of claim 11, wherein the determining code is further configured to cause the at least one processor to
calculate a ratio of the downlink traffic load to the uplink traffic load, as the UL-DL traffic load relation.

15. The apparatus of claim 11, wherein the determining code is further configured to cause the at least one processor to:
calculate a ratio of the downlink traffic load to the uplink traffic load,
weight the ratio of the downlink traffic load to the uplink traffic load by a predetermined weight; and
determine the weighted ratio as the UL-DL traffic load relation.

16. The apparatus of claim 11, wherein the selecting code is further configured to cause the at least one processor to:
determine UL-DL traffic levels for at least one UL-DL configuration; and
select a UL-DL configuration from the at least one UL-DL configuration based on the UL-DL traffic load relation and the UL-DL traffic levels.

17. The apparatus of claim 16, wherein the determining code is further configured to cause the at least one processor to:
calculate UL-DL ratios for the at least one UL-DL configuration based on factors for each of the at least one UL-DL configuration, wherein the factors comprise at least one of: the number of downlink subframes in one frame, the number of uplink subframes in one frame, the number of special subframes in one frame, the number of OFDM symbols in one subframe, the downlink ratio for the special subframe and the uplink ratio for the special subframe; and
determine each UL-DL traffic level for each of the at least one UL-DL configuration based on the UL-DL ratios.

18. The apparatus of claim 17, wherein the determining code is further configured to cause the at least one processor to:
rank the UL-DL ratios;
calculate the mean value for each pair of neighboring UL-DL ratios;
determining a range between a pair of mean values which are closest to each other; and
setting a UL-DL traffic level based on the calculated range.

19. The apparatus of claim 16, wherein the selecting code is further configured to cause the at least one processor to:
comparing the UL-DL traffic load relation with the UL-DL traffic levels; and
selecting, in response to the UL-DL traffic load relation falls into one of the UL-DL traffic levels, the UL-DL configuration corresponding to the one of the UL-DL traffic levels.

20. The apparatus of claim 11, further comprising:
updating code configured to cause the at least one processor to update a previous UL-DL configuration with the selected UL-DL configuration.

* * * * *